(12) United States Patent
Premakumar et al.

(10) Patent No.: US 10,345,791 B2
(45) Date of Patent: Jul. 9, 2019

(54) SYSTEM AND METHOD FOR DISTRIBUTING MULTIPLE LAYERS OF A COMPOSITE WITHIN A STRUCTURAL VOLUME CONTAINING AN INCLUSION

(71) Applicant: Siemens Product Lifecycle Management Software Inc., Plano, TX (US)

(72) Inventors: Vivian Paul Joseph Premakumar, Framingham, MA (US); Gilbert Choudury, Waltham, MA (US); James Koenig, Arlington, MA (US); Yuriy Dudko, Carlisle, MA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 577 days.

(21) Appl. No.: 14/860,228

(22) Filed: Sep. 21, 2015

(65) Prior Publication Data

US 2017/0080643 A1    Mar. 23, 2017

(51) Int. Cl.
   *G05B 19/4099* (2006.01)
   *G06F 17/50* (2006.01)
   *G06T 17/00* (2006.01)
   *G06T 19/20* (2011.01)
   *B33Y 50/02* (2015.01)

(52) U.S. Cl.
   CPC ......... *G05B 19/4099* (2013.01); *G06F 17/50* (2013.01); *G06T 17/00* (2013.01); *G06T 19/20* (2013.01); *B33Y 50/02* (2014.12); *G05B 2219/35134* (2013.01); *G05B 2219/49007* (2013.01); *G06F 2217/02* (2013.01);

(Continued)

(58) Field of Classification Search
   None
   See application file for complete search history.

(56) References Cited

U.S. PATENT DOCUMENTS

5,984,511 A * 11/1999 Vasey-Glandon ...... G06F 17/50
                                                    345/420
7,010,472 B1    3/2006 Vasey-Glandon et al.
(Continued)

FOREIGN PATENT DOCUMENTS

EP    1050396 A1    11/2000
RU    133773 U1    10/2013

OTHER PUBLICATIONS

Skinner, Michael, "New Applications and Approaches Expand Market for Composite Software", Reinforced Plastics, Jun. 2006, 6 pages.

(Continued)

*Primary Examiner* — Ali Naraghi

(57) ABSTRACT

Method, systems, and processes are provided for generating a model having a plurality of represented composite layers, wherein the represented composite layers do not fill one or more inclusions within a structural volume represented within a computer aided drafting (CAD) model representing a composite part. The composite part can then be manufactured, based on the resultant generated model, using any manufacturing technique, including but not limited to, 3D printer, hand layup, automated layup, and other methods for distributing multiple layers of a composite material onto a laminate surface to manufacture a composite part.

17 Claims, 12 Drawing Sheets

(52) U.S. Cl.
CPC .. *G06F 2217/06* (2013.01); *G06T 2219/2004* (2013.01); *Y02P 80/40* (2015.11)

(56) References Cited

U.S. PATENT DOCUMENTS

| | | | |
|---|---|---|---|
| 7,243,055 | B2 | 7/2007 | Chen et al. |
| 7,809,531 | B2 | 10/2010 | Murrish |
| 8,181,345 | B2 | 5/2012 | Carpentier et al. |
| 8,306,789 | B2 | 11/2012 | Krog |
| 8,655,627 | B2 * | 2/2014 | Grape ................ G06F 17/5095 700/98 |
| 2008/0312764 | A1 | 12/2008 | Murrish |
| 2011/0054850 | A1 | 3/2011 | Roach |
| 2011/0129348 | A1 | 6/2011 | Parkin et al. |
| 2012/0109594 | A1 | 5/2012 | Grape et al. |
| 2013/0309438 | A1 * | 11/2013 | O'Reilly ................ A63C 17/01 428/80 |
| 2015/0106062 | A1 * | 4/2015 | Chen-Keat ............. G06F 17/50 703/1 |
| 2016/0179984 | A1 * | 6/2016 | Chen-Keat ............. G06T 17/00 703/1 |

OTHER PUBLICATIONS

Klintworth, John, "Evolving Composites Modeling and Simulation Requirements and Solutions", MCS Software Limited, 2001, 17 pages.
Prakash, "Autolay—GUI-Based Design and Development Software for Laminated Composite Components", Computers and Graphics, Elesevier, GB, vol. 23. No. 1, Feb. 1, 1991, pp. 95-110 (Abstract), 2 pages.
PCT Search Report dated Jun. 11, 2013, for Appl. No. PCT/US2011/058722, 12 pages.
Russian Search Report dated Oct. 31, 2018, for RU Application No. 2018114100, 2 pages.

* cited by examiner

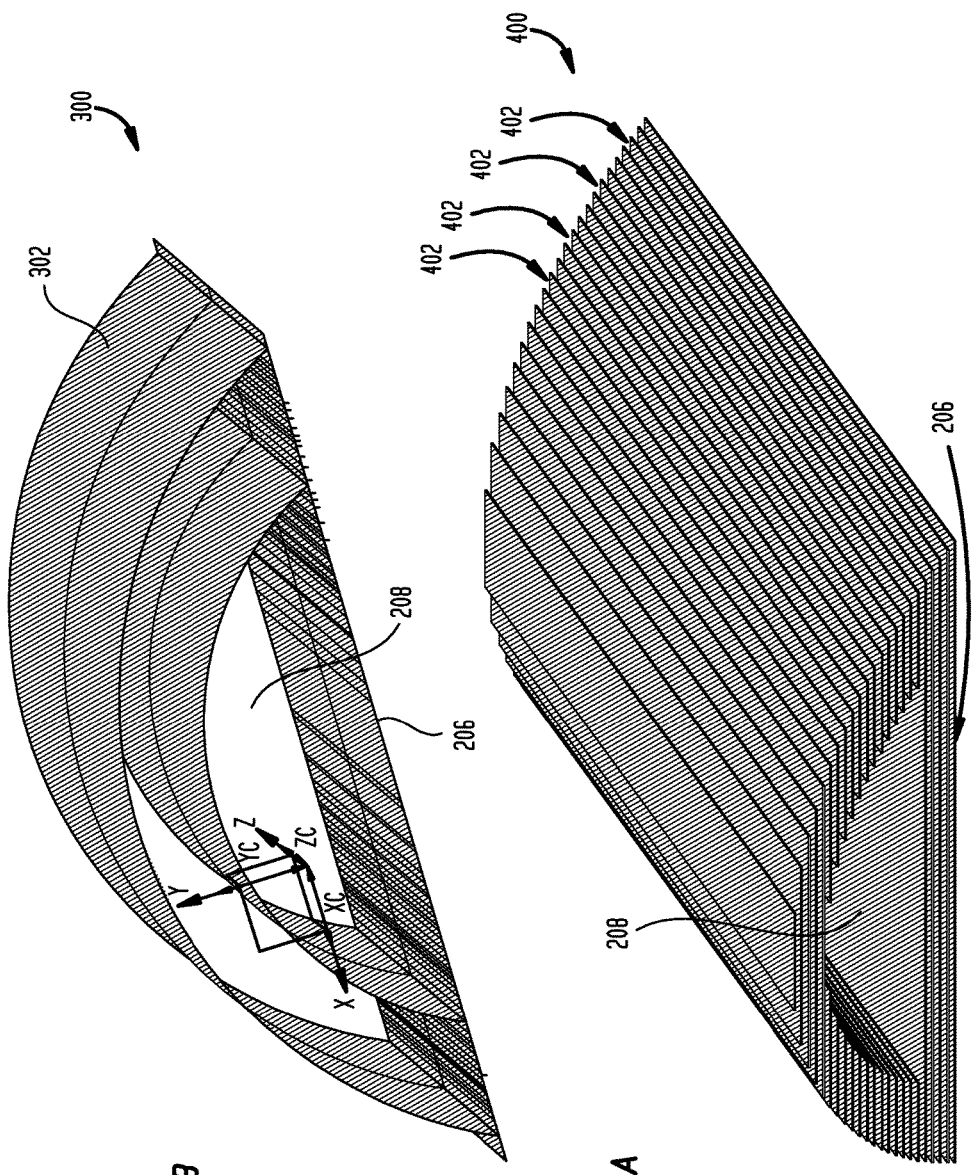

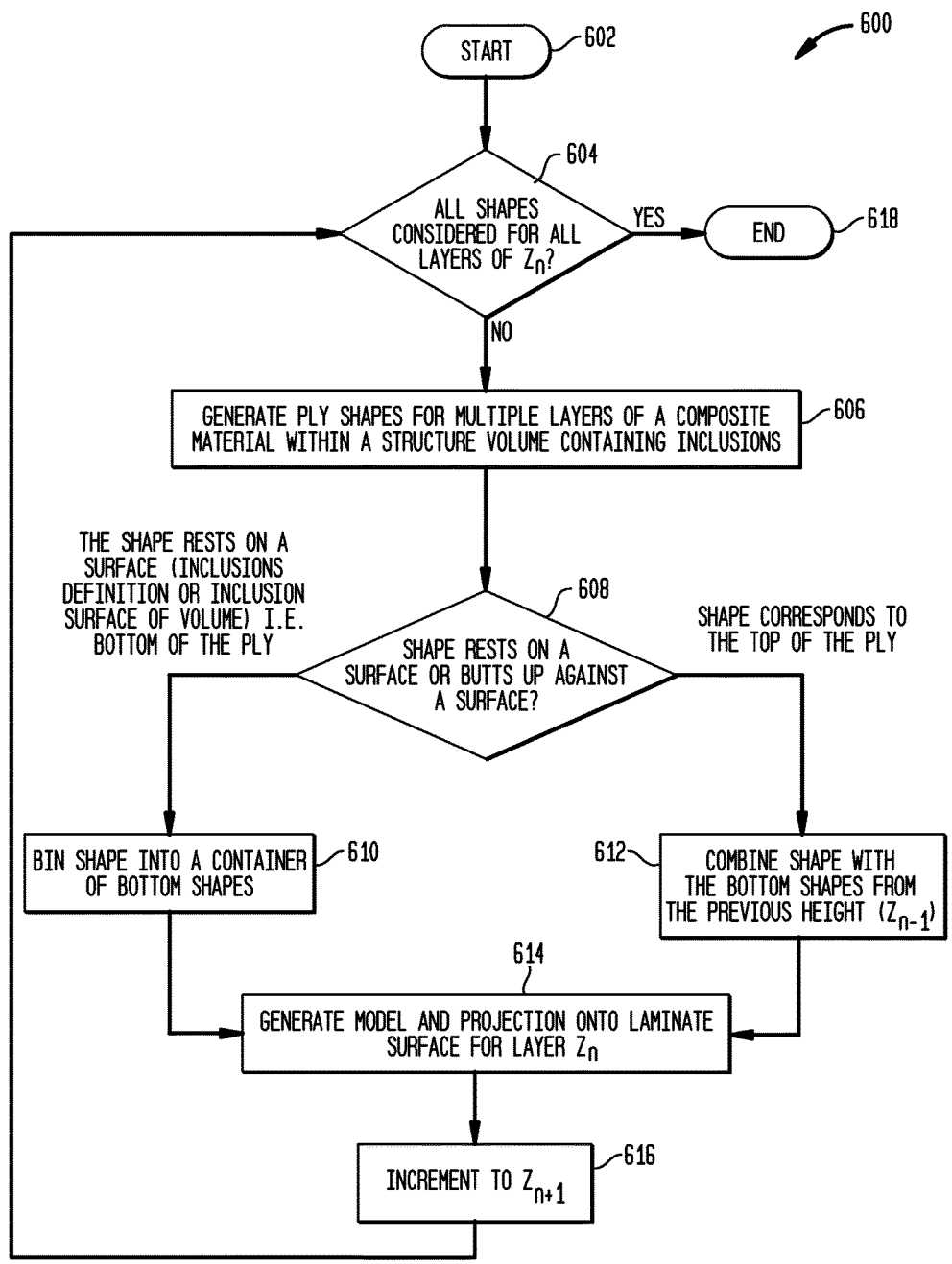

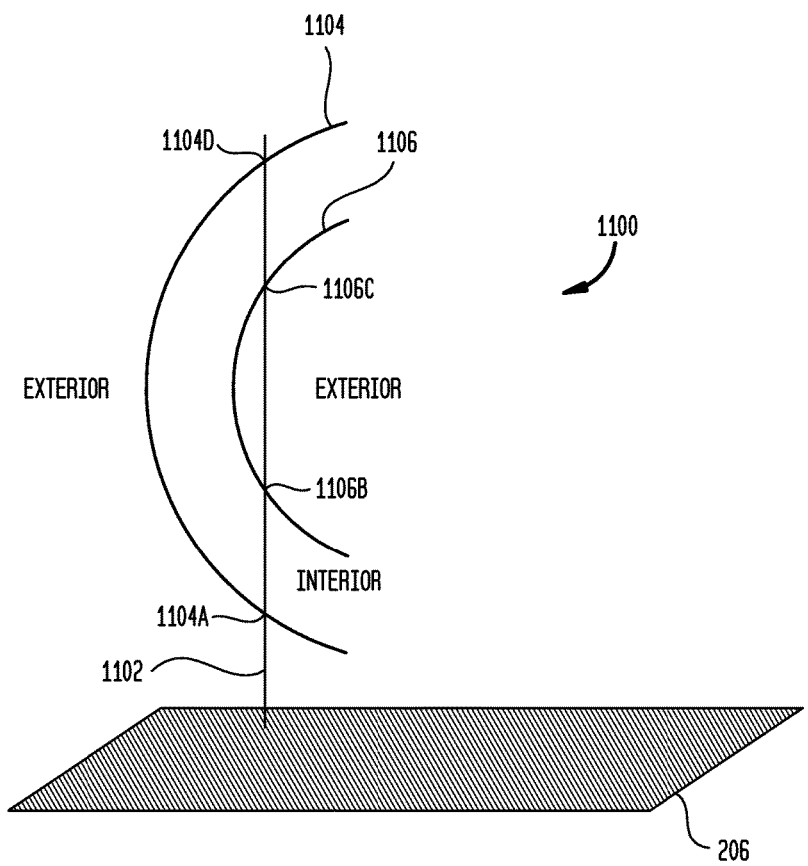

SYSTEM AND METHOD FOR DISTRIBUTING MULTIPLE LAYERS OF A COMPOSITE WITHIN A STRUCTURAL VOLUME CONTAINING AN INCLUSION

CROSS REFERENCE

This patent document shares common subject matter with U.S. Pat. No. 8,655,627, "Determining a Distribution of Multiple Layers of a Composite Material Within a Structural Volume," issued Feb. 18, 2014 (incorporated herein by reference), but is not otherwise related thereto.

TECHNICAL FIELD

The present disclosure is directed, in general, to computer-aided design, visualization, and manufacturing systems, product data management (PDM) systems, product lifecycle management (PLM) systems, and similar systems, that are used to create and manage data for products and other items (collectively referred to herein as product systems). More particularly, the invention relates to determining a distribution of multiple layers of materials to fill a structural volume.

BACKGROUND

PLM systems may include a graphical user interfaces (GUI) through which a manufacturing and/or a work environment may be simulated. Such graphical user interfaces may benefit from improvements.

Many manufactured products in the automotive, aerospace, wind energy, marine vessel, and defense technologies may include structures fabricated from multilayer composite materials. When properly designed and fabricated, multilayer composite structures can outperform structures fabricated by conventional methods, e.g., by bending, machining, and fastening pieces, or by milling a structure from a single material. A multilayer composite structure can provide superior durability and strength-to-weight ratio over structures fabricated by conventional methods. Composite structures can provide additional benefits over traditional structures depending on the particular application, because composite structures can be tailored to meet specific demands of a particular application.

SUMMARY

Variously disclosed embodiments include systems and methods that may be used to generate a model having a plurality of represented composite layers that leave an inclusion void of material. In one example, a method performed by a data processing system is provided. The method includes receiving a computer aided drafting (CAD) model representing a composite part having a height representing a plurality of composite material layers, where said CAD model contains one or more inclusions within a structural volume; generating, for each layer height of the composite part, a ply shape representation at each layer of a composite material within the structural volume having a first surface; determining, for each layer height of the composite part, whether the first surface rests on or abuts a second surface; if, as a result of the determining step, the first surface rests on the second surface, storing the generated ply shape representation into a container of bottom shapes; if, as a result of the determining step, the first surface abuts the second surface, combining the generated ply shape representation with one or more generated ply shapes representing bottom shapes from a previous layer height; generating, as a result of the plurality of determining steps, a resultant model and resultant projection onto a laminate surface of the CAD model having a resulting plurality of represented composite layers, wherein said represented composite layers are not within one or more inclusions of the represented composite part.

In another example, a data processing system is provided. The data processing system includes a processor; and an accessible memory, the data processing system is particularly configured to: receive a computer aided drafting (CAD) model representing a composite part having a height representing a plurality of composite material layers, where said CAD model contains one or more inclusions within a structural volume; generate, for each layer height of the composite part, a ply shape representation at each layer of a composite material within the structural volume having a first surface; determine, for each layer height of the composite part, whether the first surface rests on or abuts a second surface; if, as a result of the determining step, the first surface rests on the second surface, storing the generated ply shape representation into a container of bottom shapes; if, as a result of the determining step, the first surface abuts the second surface, combining the generated ply shape representation with one or more generated ply shapes representing bottom shapes from a previous layer height; generating, as a result of the plurality of determining steps, a resultant model and resultant projection onto a laminate surface of the CAD model having a resulting plurality of represented composite layers, wherein said represented composite layers are not within one or more inclusions of the represented composite part.

In another example, a non-transitory computer-readable medium is provided. The non-transitory computer-readable medium is encoded with executable instructions that, when executed, cause one or more data processing systems to receive a computer aided drafting (CAD) model representing a composite part having a height representing a plurality of composite material layers, where said CAD model contains one or more inclusions within a structural volume; generate, for each layer height of the composite part, a ply shape representation at each layer of a composite material within the structural volume having a first surface; determine, for each layer height of the composite part, whether the first surface rests on or abuts a second surface; if, as a result of the determining step, the first surface rests on the second surface, storing the generated ply shape representation into a container of bottom shapes; if, as a result of the determining step, the first surface abuts the second surface, combining the generated ply shape representation with one or more generated ply shapes representing bottom shapes from a previous layer height; generate, as a result of the plurality of determining steps, a resultant model and resultant projection onto a laminate surface of the CAD model having a resulting plurality of represented composite layers, wherein said represented composite layers are not within one or more inclusions of the represented composite part The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

The term "adjacent to" may mean: that an element is relatively near to but not in contact with a further element; or that the element is in contact with the further portion, unless the context clearly indicates otherwise.

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 3 illustrates a CAD model of a solid represented upon a laminate surface.

FIGS. 4a and 4b illustrate the distribution of multiple layers of a composite material within a structural volume containing an inclusion upon a laminate surface.

FIG. 6 illustrates a functional block diagram of an exemplary method for determining the distribution of multiple layers of a composite material within a structure volume containing one or more inclusions.

FIG. 11 illustrates an exemplary embodiment of a ray intersection which produces results that indicate whether the curve forms the top or bottom of a ply.

DETAILED DESCRIPTION

Figure 1:
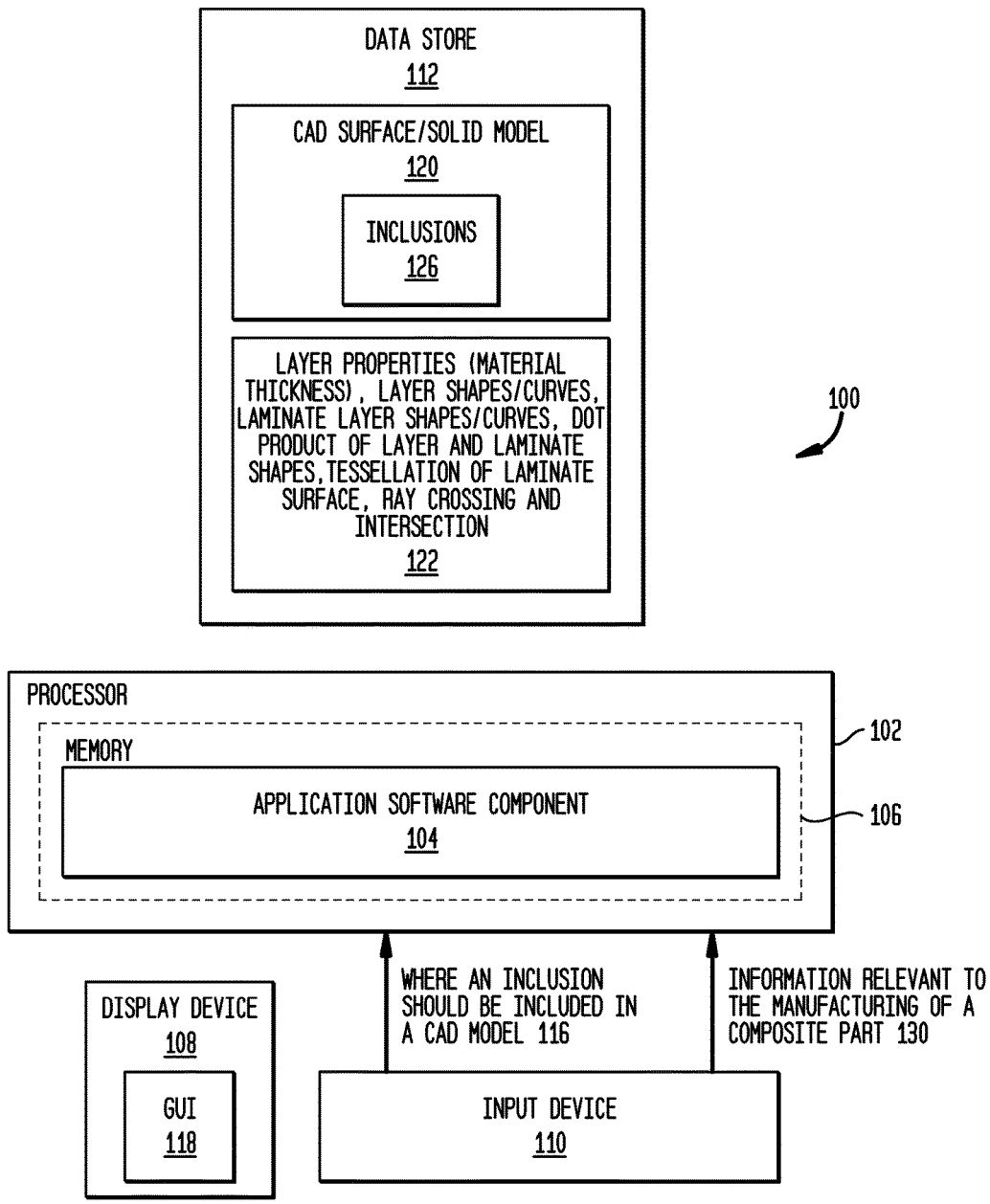
FIG. 1 illustrates a functional block diagram of an exemplary system that facilitates distributing multiple layers of a composite material within a structure volume containing one or more inclusions.

Various technologies that pertain to drawing systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system components may be performed by multiple components. Similarly, for instance, a component may be configured to perform functionality that is described as being carried out by multiple components. The numerous innovative teachings of the present application will be described with reference to exemplary non-limiting embodiments.

3D composite structural parts are commonly built using layers of composite material and lightweight 3D cores. The lightweight cores provide structural support while resulting in significant weight reduction. This is a common design approach with structural parts in multiple industries. Designing and fabricating a structure comprising multiple layers of composite material may pose engineering challenges. This challenge is exacerbated when structural enhancements (e.g., inclusions) are provided within the composite layered build-up, such as a void (an interior portion of the layered-build up that is intended to remain empty) or core (a void that is later intended to be filled, typically with another material that has different mechanical properties) that are typically used, for example, to reduce weight, add structural integrity, etc. to the composite part. Hereafter, the term inclusions is used to include one or more of a core, void, or other structural enhancement located at least partially within the boundaries of the composite part. Such inclusions create challenges because the build-up of the composite part generally keeps the inclusion area unfilled at the time the composite part is being initially manufactured.

In brief, embodiments of the invention are directed to methods and systems for distributing multiple layers of a composite material within a structure volume containing inclusions. Composite materials, include herein, any such composite material or any suitable deformable and/or conformable material, to fill a structure being designed and fabricated. The structure may be a component of a manufactured product, including but not limited to, a door panel for an automobile, an aerodynamic support strut for an aircraft, a wing for an aircraft, a cowling or structural panel for a jet, a blade of a wind turbine, etc. In various embodiments, the structure comprises a volume that is to be filled with multiple layers of composite material according to a determined distribution, wherein the volume contains one or more inclusions. Since each layer can be thin, a significant number of layers may be required to fill the volume of a designed structure. In various implementations, design and/or performance constraints may be associated with the structure, and these constraints may contribute to the determination of the distribution of layers for fabricating the structure.

With reference to FIG. 1, an exemplary system 100 for distributing multiple layers of a composite material within a structure volume containing one or more inclusions is illustrated. The system 100 may include at least one processor 102 that is configured to execute one or more application software components 104 from a memory 106 in order to carry out the various features described herein. The application software component 104 that carries out the distribution of multiple layers of a composite material within a structure volume containing inclusions may correspond to an independent application comprised of one or more components and/or may be integrated/included with software that carries out other functions.

Examples of PLM software and/or CAD/CAM/CAE (computer-aided design/computer-aided manufacturing/computer-aided engineering) software that may be adapted to include at least some of the functionality described herein for distributing multiple layers of a composite material within a structure volume containing one or more inclusions includes FiberSim, a software application available from Siemens Product Lifecycle Management Software Inc. (Plano, Tex.).

However, it should also be understood that the described application software component 104 that carries out distributing multiple layers of a composite material within a structure volume containing one or more inclusions may correspond to or be integrated into other types of software, including but not limited to, manufacturing software, design software, 3D printing software (such as software utilized for the 3D printing of laminar parts), additive manufacturing software, and/or any other type of software that may have a use for distributing multiple layers of a composite material within a structure volume containing one or more inclusions.

The described system may include at least one display device 108 (such as a display screen) and at least one input device 110. For example, the processor may include as part of a PC, notebook computer, workstation, server, tablet, mobile phone, or any other type of computing system. The display device, for example, may include an LCD display, monitor, and/or a projector and may provide a graphical user interface (GUI) 118. The input devices, for example, may include an analog stick, d-pad, game controller, mouse, pointer, touch screen, touch pad, drawing tablet, track ball, buttons, keypad, keyboard, camera, motion sensing device that captures motion gestures, or any other type of input device capable of providing the inputs described herein. Also for devices such as a mobile phone or tablet, the processor 102 may be integrated into a housing that includes a touch screen that serves as both an input and display device. Further, it should be appreciated that some input devices may include a plurality of different types of input devices. For example, a game controller may include an analog stick, a d-pad, and a plurality of buttons.

However, it should be appreciated that example embodiments may use other types of input and display devices. Further it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a processor of the server.

In example embodiments, the system may further include a data store 112. The data store may include a CAD model of a surface or solid model 120 containing one or more inclusions 126, and data about the model 120, such as one or more layer properties (material thickness), layer shapes/curves, laminate layer shapes/curves, dot product of layer and laminate shapes, tessellation of laminate surface, ray crossing and intersection 122 which may be stored therein or computed dynamically as needed.

The processor 102 may be configured to receive inputs, such as inputs regarding where an inclusion should be included in a CAD model 116, types of material used, and other information relevant to the manufacturing of a composite part 130.

Figure 2A:
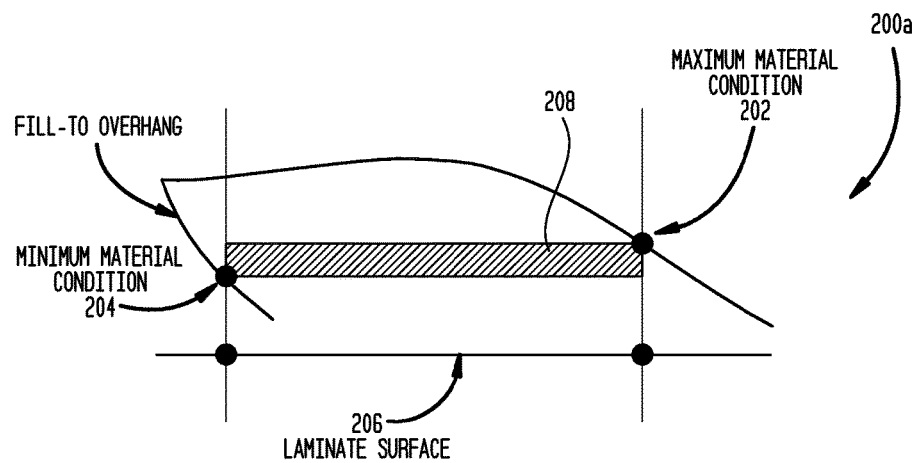
FIGS. 2a and 2b illustrate composite parts that contain an inclusion.
Figure 2B:
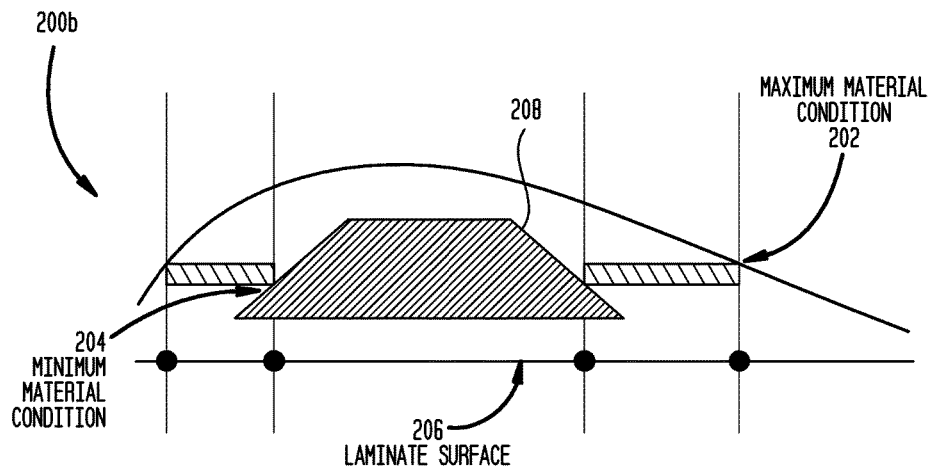

FIGS. 2a and 2b illustrate composite parts that contain an inclusion. Composite part 200a and composite part 200b each contains inclusion 208, which may result in a core or void, depending upon the manufacturing needs. Each composite part 200a, 200b includes a maximum material condition 202 and minimum material condition 204. Layers of composite material (not illustrated) will be layered upon laminate surface 206 as illustrated below. The embodiments illustrated herein support the layering of composite material(s) upon a laminate surface wherein the one or more inclusions (such as inclusions 208) are geometry that (a)

rests on another body and/or (b) rests around another interior body. Accordingly, the embodiments illustrated herein allow for the distribution of multiple layers of a composite material within a structure volume containing one or more inclusions that are either an exterior or interior unsupported laminate ply due to an overhang.

A composite structure includes any structure designed and fabricated using multiple layers of composite material or any suitable material that may deform and/or conform to shapes for filling a multilayer structure. The embodiments illustrated herein are for illustration purposes. In practice, the structure may have any shape and may contain one or more inclusions of any shape. The layers of a composite structure may not be of the same composition. For example, some layers may be a composite material of a first composition and thickness, and some layers may be a composite material of a second composition of a same or different thickness. In some implementations, a composite structure may comprise a mixture of composite layers (e.g., layers of a polymer/fiber composition) and non-composite layers (e.g., layers of a polymer or metallic sheet).

Each layer of the composite material in a finished structure may comprise, for example, high-strength fiber embedded in a hardened resin. Other suitable compositions for the composite material may be used including, without limitation, composites comprising any one or more of the following elements: glass fiber, carbon fiber, boron fiber, ceramic matrix, epoxy, polyester, dry woven fiber, pre-impregnated woven fiber, infused woven fiber. As one example, while a structure is being fabricated, the resin may not be hardened or may not be present. For example, the resin may be in a liquid or gel form and a hardener added after a layer is positioned in the structure. In some cases, the resin and hardener may be added after some fabric is positioned in the structure. In some embodiments, the resin and hardener may be premixed and present with the fabric or applied subsequently, yet require a cure time, e.g., between about 5 minutes and about 24 hours, to solidify the structure. When a resin/hardener mix is applied subsequently to a structure, the mix may be forced into the multilayer structure under pressure or vacuum. The fiber may be a glass-based fiber, Kevlar, a carbon fiber, or any other similar material, and the hardened resin may be an epoxy-based resin, a polymer, a glass/polymer or carbon fiber/polymer composite. In some embodiments, the carbon fiber or carbon fiber/polymer composite comprises carbon nanotubes. When a structure is fabricated, it may be assembled in a "lay-up" process in which each layer is positioned and added successively to the structure. In some cases, portions of a structure may be laid-up with multiple layers of composite material, and then the portions bonded together.

In view of the various types of materials and assembly methods available for composite structures, it may be appreciated that manufacturing a structure from multiple layers of composite material can provide significantly greater flexibility in meeting design and performance specifications with a finished product. For example, flexural and mechanical properties of the composite structure may be tailored by selecting an orientation of a fabric, weave of fabric, fabric type, and/or resin type within each of the layers within the structure. Further, the way layers are configured and/or distributed within the structure can affect the flexural and mechanical properties of the composite structure.

Figure 4B:
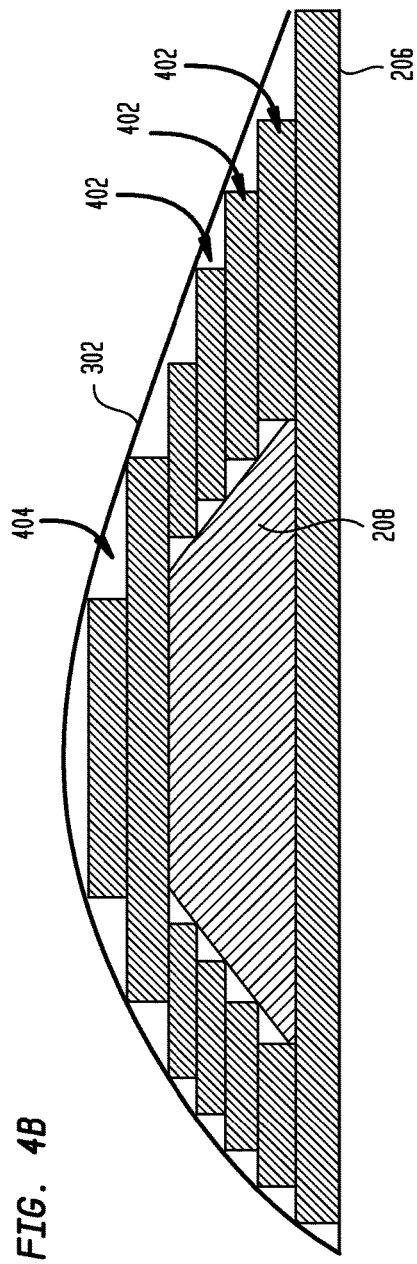

FIG. 3 illustrates a CAD model of a solid 300 including a fill-to-surface 302, inclusion 208, as represented upon a laminate surface 206. As a result of the embodiments herein, the distribution of multiple layers of a composite material 402 within a structural volume 400 containing an inclusion 208 upon a laminate surface 206 is illustrated in FIGS. 4a and 4b. Any pockets 404 (e.g., resin pool areas or areas with low fiber density) would typically be addressed through the use of a full body ply placed as the first and last ply in a stack-up to provide a smooth finished surface. Accordingly, the embodiments illustrated in FIGS. 3, 4a-4b illustrate a volume fill for a solid containing one or more inclusions. Accordingly, a design may or may not resequence the plies to meet a variety of design, manufacturing, and/or structural requirements/needs.

FIGS. 5a-5e illustrate a part 500 wherein the layer shape top and bottom is projected 506 back onto laminate surface 206, wherein the part 500 includes multiple plies 502, 504 (which are layers of a composite surface) to be layered around a core 208 as built up upon the laminate surface 206. As illustrated herein, Z refers to the height of the layer surface; $_n$ denotes the integral multiple of the thicknesses of the layers below. It is not required that the layers below have the same thickness.

Accordingly, for example, if a composite part with a fill volume of 10 mm, and each ply, for example, has a thickness of 1 mm, the first ply is placed at $Z_0$, the second at $Z_1$, the third at $Z_2$, and so on. The projection of the layers 502, 504 at layer $Z_n$ onto the laminate surface 206 are illustrate at a, and the projection 506 of the inclusion 208 at layer $Z_{n-1}$ is illustrated as b. Arrows 508 indicate the normal orientation pointing towards the volume.

Referring again to FIG. 5a, when filling structural volumes, such as part 500, containing one or more inclusions, such as inclusion 208, the ply 502, 504 shall account for regions where it rests on top of a surface and regions where it abuts a surface. The ply shape shall be composed of the correct shape for the top of the ply and the bottom of the ply.

Figure 5A:
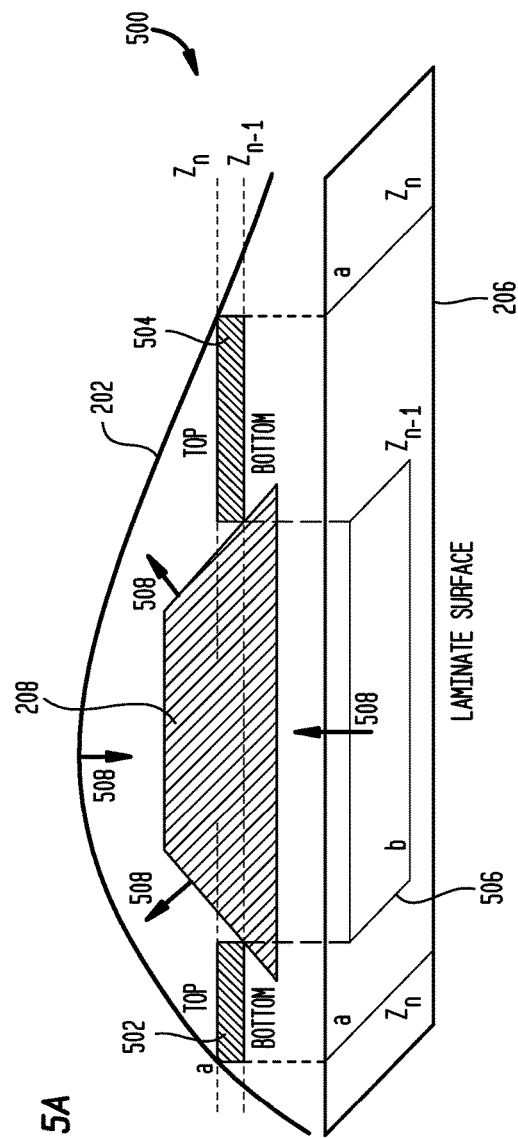
FIGS. 5a-5e illustrate a part projected back onto a laminate surface, wherein the part includes multiple ply to be layered around an inclusion as built up upon the laminate surface.
Figure 5B:
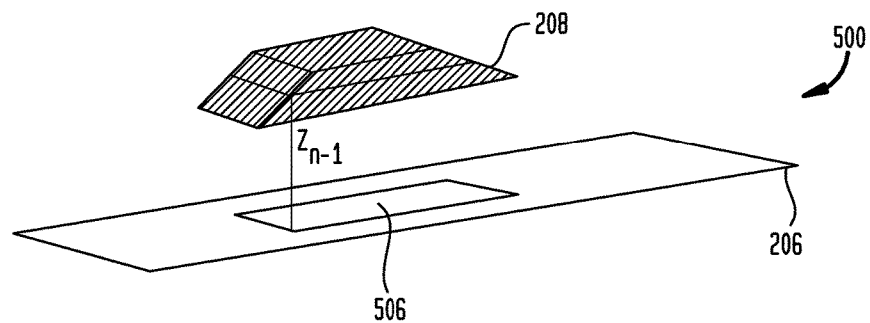
Figure 5C:
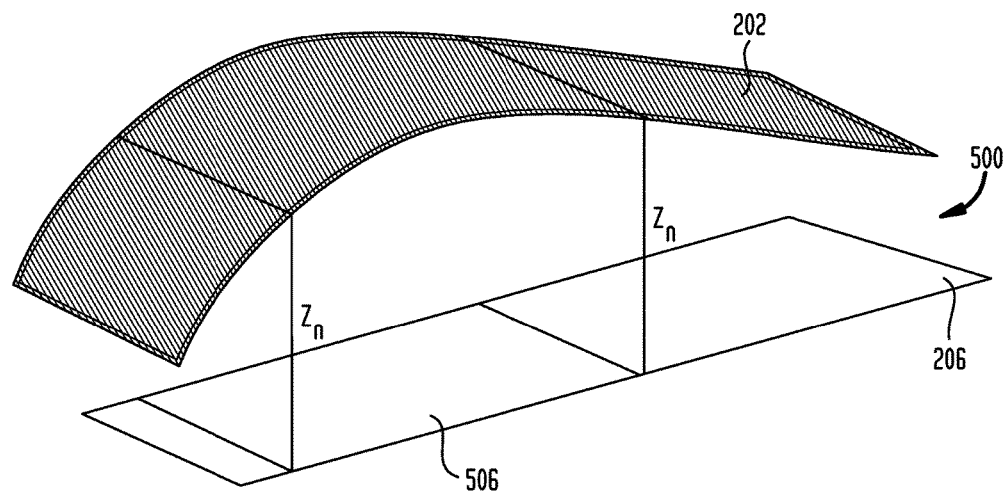
Figure 5D:
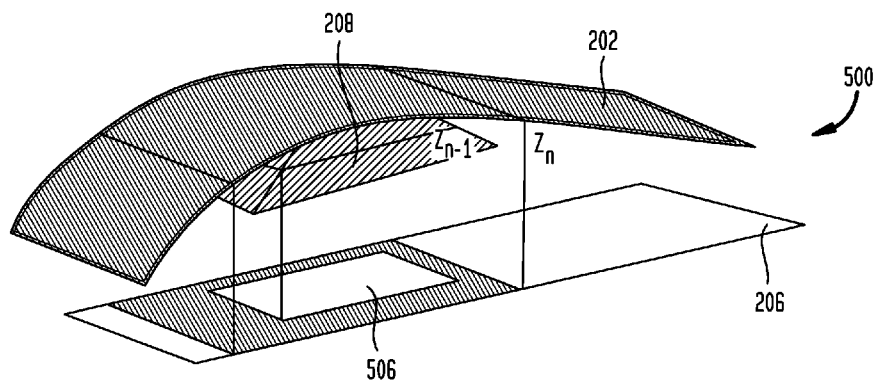
Figure 5E:
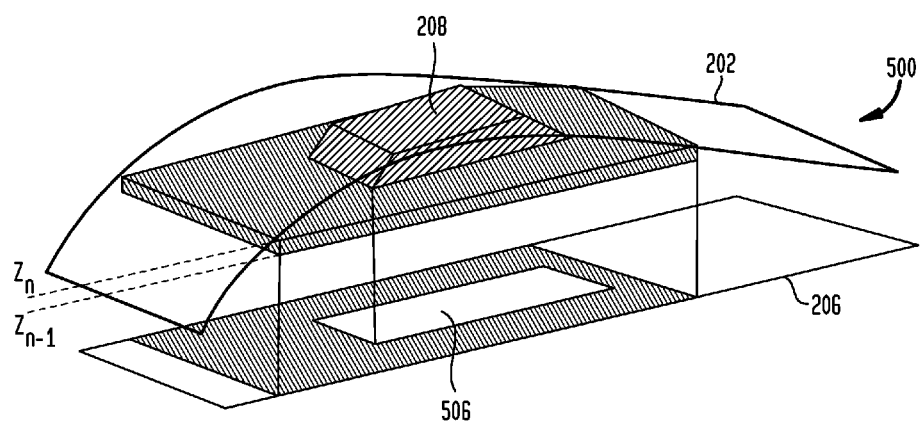

FIG. 5b illustrates the ply shape generated on the laminate surface 206 for the inclusion 208 at height $Z_{n-1}$. FIG. 5c illustrates the ply shape being generated on the laminate surface 206 for outer surface 202 of volume at height $Z_n$. FIG. 5d illustrates the combined ply shapes from levels $Z_{n-1}$ and $Z_n$, generated on the laminate surface 206. FIG. 5e illustrates the ply at height Zn−1.

FIG. 6 illustrates a functional block diagram of an exemplary method for determining the distribution of multiple layers of a composite material within a structure volume containing one or more inclusions 600. The method 600 can be implemented by the system illustrated in FIG. 1, FIG. 9, or by other systems. The method starts at block 602. At block 604, ply shapes for multiple layers of a composite material within a structure volume containing inclusions are generated at block 606 for each layer of $Z_n$. Techniques for determining the intersection shapes include those that are described in U.S. Pat. No. 8,655,627, "Determining a Distribution of Multiple Layers of a Composite Material Within a Structural Volume," issued Feb. 18, 2014 (incorporated by reference herein), among other techniques known in the art.

At block 608, it is determined whether the shape rests on a surface or abuts a surface. Exemplary methods for determining whether the shape rests on a surface or abuts a surface are illustrated in FIGS. 7-8.

Figure 7:
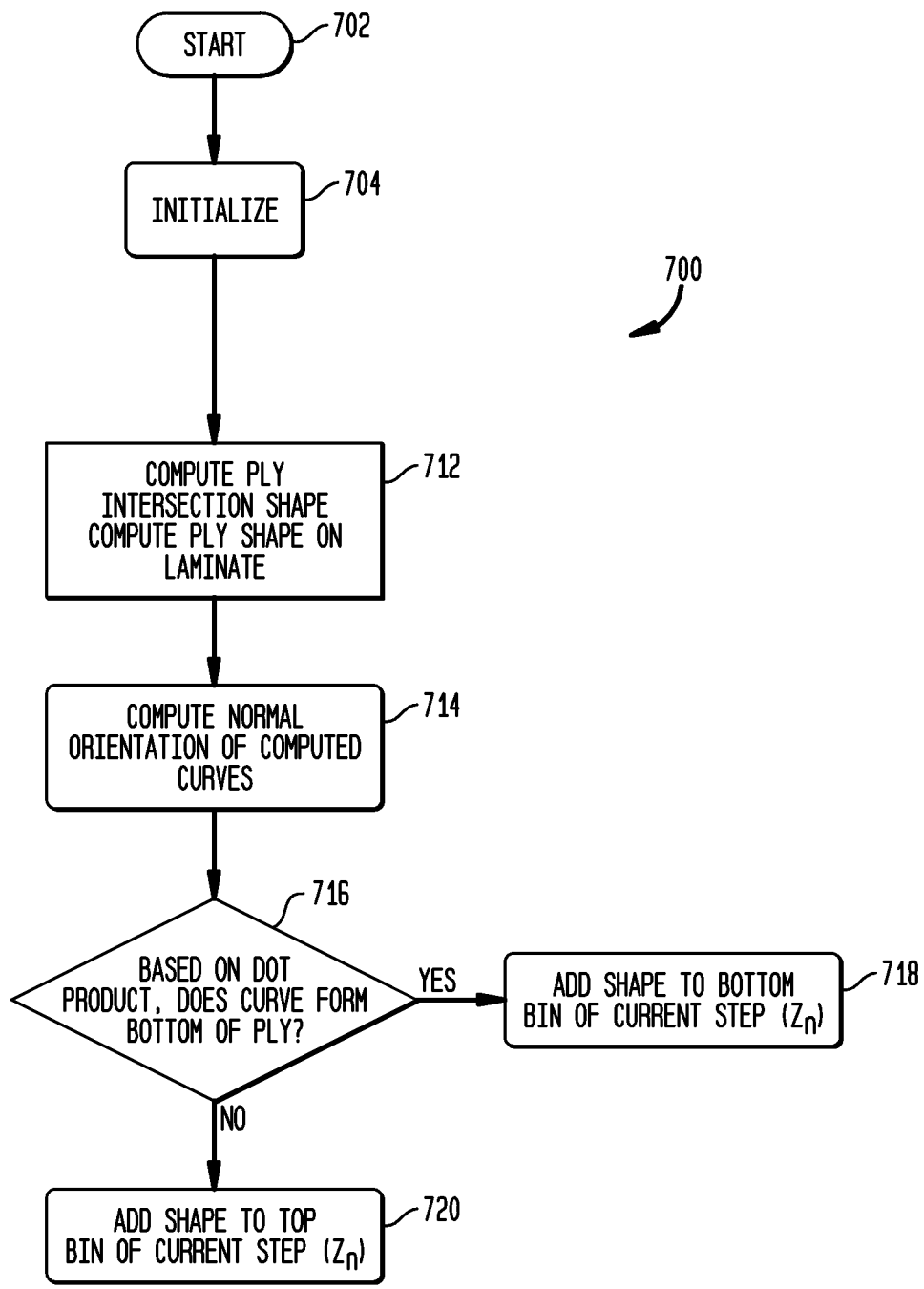
FIG. 7 illustrates a functional block diagram of an exemplary method for determining whether a shape rests on a surface or abuts a surface.
Figure 8:
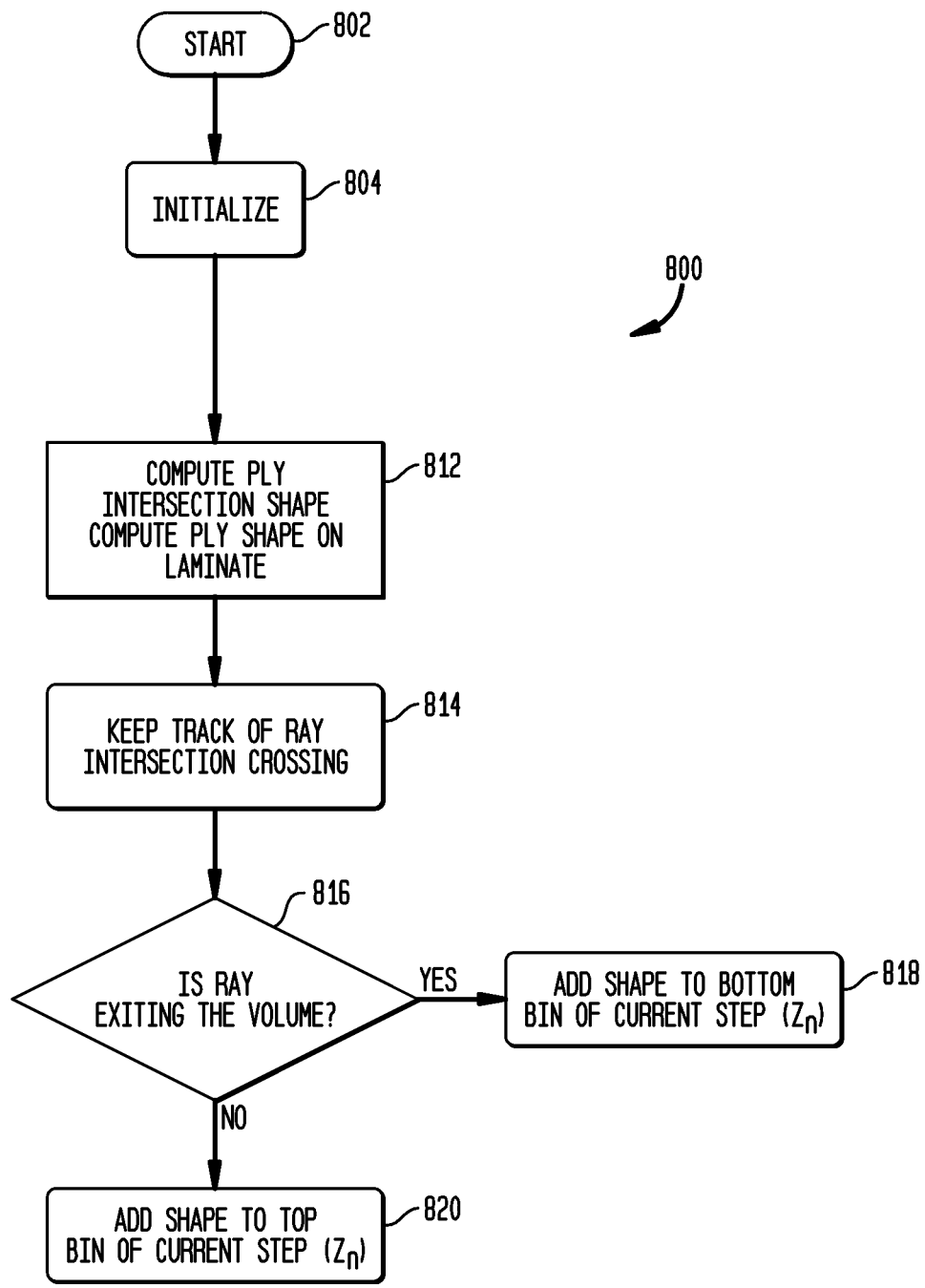
FIG. 8 illustrates an alternate embodiment of a functional block diagram of an exemplary method for determining whether a shape rests on a surface or abuts a surface.
Figure 9:
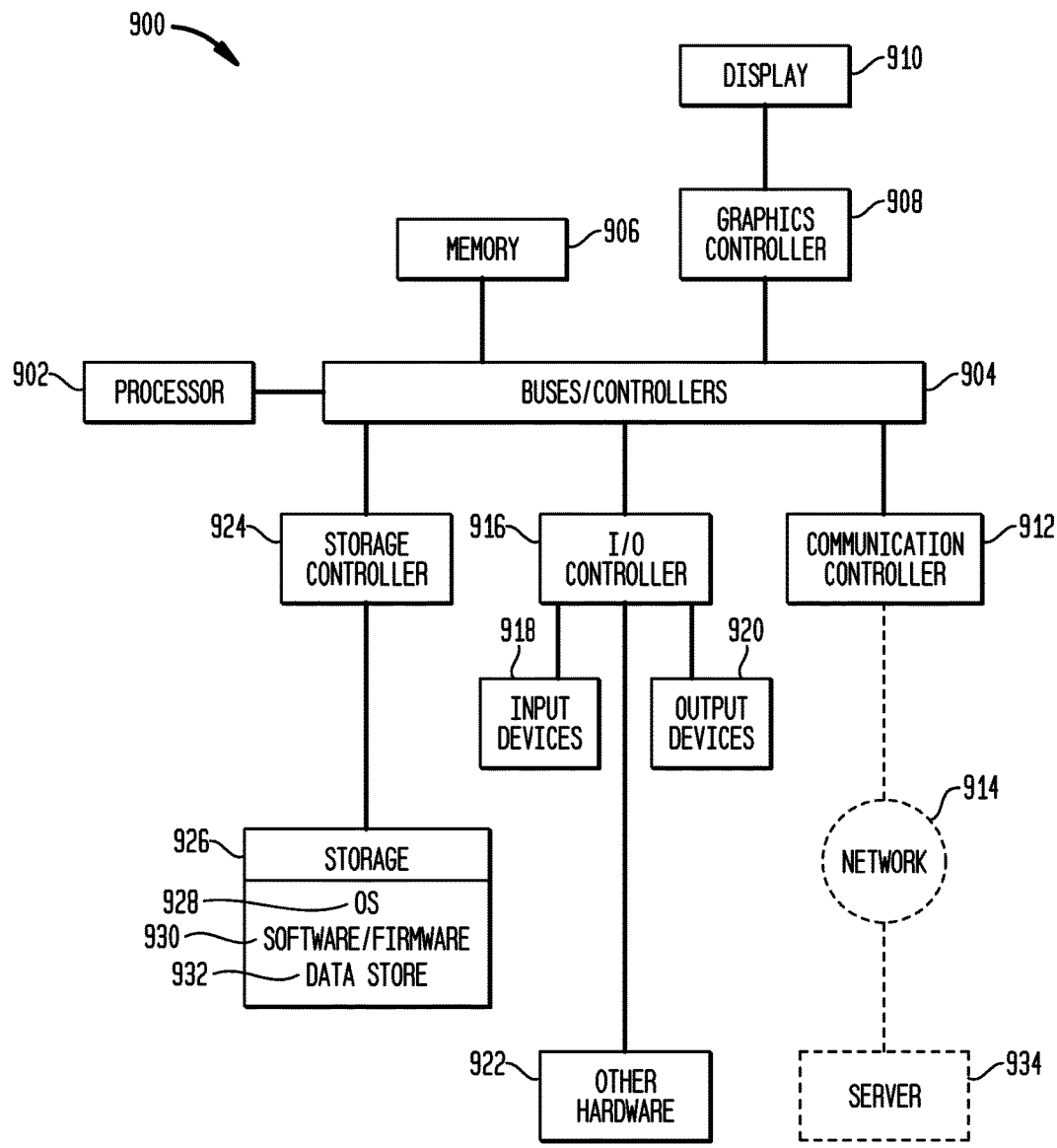
FIG. 9 illustrates a functional block diagram of an exemplary data processing system (also referred to as a computer system) in which an embodiment illustrated herein can be implemented.

FIG. 7 illustrates a functional block diagram of an exemplary method for determining whether a shape rests on a surface or abuts a surface 700 and can be implemented by the system illustrated in FIG. 1, FIG. 9, or by other systems. The method begins by starting at block 702. At block 704 initialization begins by loading a CAD model, such as the model illustrated in FIG. 3. The CAD model may be stored, for example, in a data store 112 as illustrated in FIG. 1. The CAD model, such as CAD model 120, includes one or more inclusions 126, which may also be stored in data store 112.

At block 712, compute the ply intersection shape and the projection onto the laminate, including plies that may have different material thicknesses for filling the structural volume. The computed ply intersection shape results in a CAD curve which is then used to compute the normal orientation for each intersection shape computed for the curve for the solid surface at block 714, resulting in the dot product of said intersection. The dot product 122, optionally, may be stored in the data store 112 if preferred for later use. The normal orientation can be obtained from the CAD surface definition. At block 716, the system decides whether the curve forms the bottom or top of the ply based on the resultant dot product computed in block 714. If the dot product indicates that the curve forms the bottom of the ply, the method continues to block 718. If the dot product indicates that the curve forms the top of the ply, the method continues to block 720.

Figure 10A:
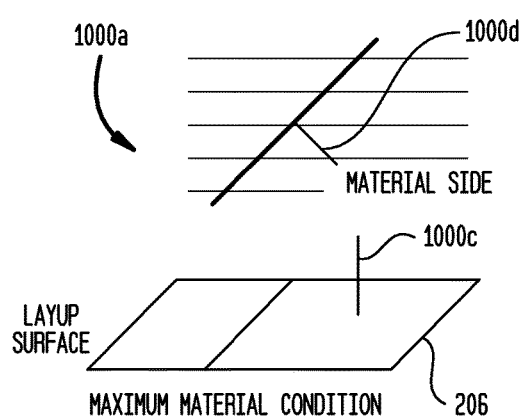
FIGS. 10a and 10b illustrate maximum and minimum material conditions as determined by the direction of the fill-to normal.
Figure 10B:
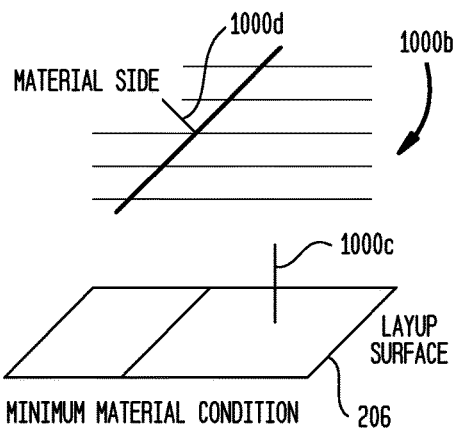
Figure 10C:
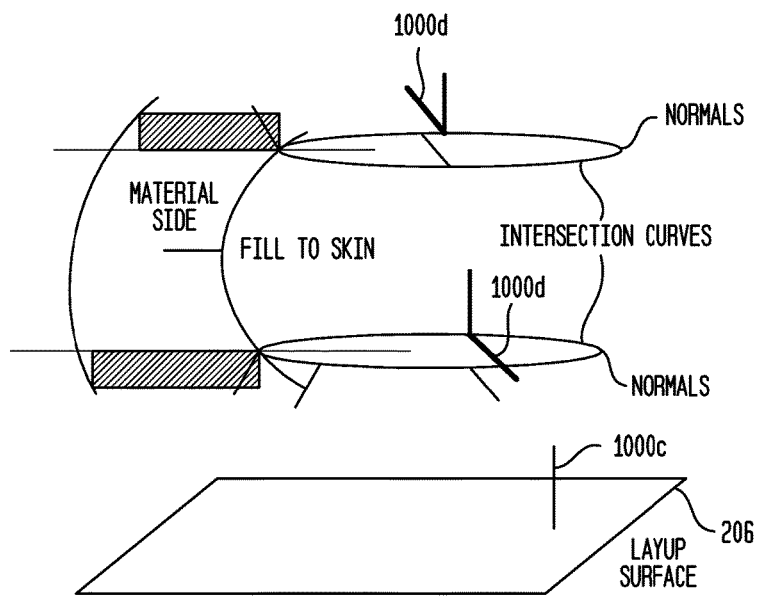
FIG. 10c illustrates an exemplary embodiment of a dot product which produces a result that indicates whether the curve forms the top or bottom of a ply.

Now referring to FIGS. 10a and 10b which illustrate maximum and minimum material conditions, 1000a, 1000b (respectively) as determined by the direction of the fill-to normal. A maximum material condition 1000a occurs when the layup normal 1000c and the fill-to normal 1000d are pointing to the material side, as illustrated in FIG. 10a. A minimum material condition 1000b occurs when the layup normal 1000c and the fill-to normal 1000d are pointing at different sides i.e. the layup normal 1000c is pointing towards the material side, while the fill-to normal 1000d points to the exterior side, as illustrated in FIG. 10b. FIG. 10c illustrates an exemplary embodiment of a dot product which produces a result that indicates whether the curve forms the top or bottom of a ply as indicated by the fill-to normals 1000d as compared to the layup normal 1000c.

Accordingly, if the dot product of the fill-to curve normal and layup curve normal are less than zero, a maximum material condition exists. If the dot product of the fill-to curve normal and layup curve normal are greater than zero, a minimum material condition exists. If the dot product of the fill-to curve normal and the layup curve normal equals zero, then either a maximum or minimum material condition exists, and it can be generally treated as a maximum material condition.

Referring again to FIG. 7, if the dot product indicates that the curve forms the bottom of the ply, at block 718, the shape is added to the bottom bin of the current step height, such as $Z_n$. If the dot product indicates that the curve forms the top of the ply, at block 720, the shape is added to the top of the bin of the current step, such as $Z_n$.

FIG. 8 illustrates an alternate embodiment a functional block diagram of an exemplary method for determining whether a shape rests on a surface or abuts a surface 800 and can be implemented by the system illustrated in FIG. 1, FIG. 9, or by other systems. The method begins by starting at block 802. At block 804 initialization begins by loading a CAD model, such as the model illustrated in FIG. 3. The CAD model may be stored, for example, in a data store 112 as illustrated in FIG. 1. The CAD model, such as CAD model 120, contains one or more inclusions 126, which may also be stored in data store 112.

At block 812, the ply intersection shape and the projection onto the laminate is computed, including plies that may have different material thicknesses for filling the structural volume.

At block 814, a ray is shot from the fill-from-surface and the fill-to-intersection crossing is determined. The ray intersection crossing 122, optionally, may be stored in the data store 112 if preferred for later use. At block 816, the system decides whether the ray is exiting the volume based on the resultant ray intersection computed in block 814. If the ray intersection is exiting the volume, the method continues to block 818. If the ray intersection is not exiting the volume the method continues to block 820. FIG. 11 illustrates such an example.

FIG. 11 illustrates an exemplary embodiment of a ray intersection 1100 which produces results that indicate whether the curve forms the top or bottom of a ply. Ray 1102 intersects curves 1104, 1106 at points 1104A, 1106B, 1106C, and 1104D. For curve 1104, at intersection 1104A, the ray 1102 moves from the exterior to the interior of the curve and thus indicates a minimum material condition. At intersection 1104D, the ray 1102 moves from the interior to the exterior of the curve 1104 and thus indicates a maximum material condition.

For curve 1106, at intersection 1106B, the ray 1102 moves from the interior to the exterior of the curve 1106, and thus indicates a maximum material condition. At intersection 1106C, the ray 1102 moves from the exterior to the interior of the curve 1106 and thus indicates a minimum material condition.

Referring again to FIG. 8, if the ray intersection is exiting the volume, at block 818, the shape is added to the bottom bin of the current step height, such as $Z_n$. If the ray intersection is not exiting the volume, at block 820, the shape is added to the top of the bin of the current step, such as $Z_n$.

Referring again to FIG. 6, at block 608, if the shape rests on a surface, i.e. bottom of the ply, the shape is binned into a container of bottom shapes at block 610. If the shape corresponds to the top of the ply, the shape is combined with the bottom shapes from the previous height ($Z_{n-1}$) at block 612. At block 614, the model and projection are generated onto to laminate surface for layer of $Z_n$, and the layer is incremented at block 616 to $Z_{n+1}$. Once all the layers are considered at block 604, the method ends at block 618.

As a result of the methods, a model is generated having a plurality of represented composite layers, wherein the represented composite layers are not within one or more inclusions of the represented composite part. The composite part can then be manufactured based on the resultant generated model using any manufacturing technique, including but not limited to, 3D printing, additive manufacturing, hand layup, automated layup, and other methods for distributing multiple layers of a composite material onto a laminate surface to manufacture a composite part.

FIG. 9 illustrates a functional block diagram of an exemplary data processing system 900 (also referred to as a computer system) in which an embodiment can be implemented, for example, as a portion of a PLM, CAD, and/or drawing system operatively configured by software or otherwise to perform the processes as described herein. The data processing system depicted includes at least one processor 902 (e.g., a CPU) that may be connected to one or more bridges/controllers/buses 904 (e.g., a north bridge, a south bridge). One of the buses 904, for example, may include one or more I/O buses such as a PCI Express bus. Also connected to various buses in the depicted example may include a main memory 906 (RAM) and a graphics controller 908. The graphics controller 908 may be connected to one or more display devices 910. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 912 (Ethernet controllers, WiFi controllers, cellular controllers) operative to connect to a local area network (LAN), Wide Area Network (WAN), a cellular network, and/or other wired or wireless networks 914 or communication equipment.

Further components connected to various busses may include one or more I/O controllers 916 such as USB controllers, Bluetooth controllers, and/or dedicated audio controllers (connected to speakers and/or microphones). It should also be appreciated that various peripherals may be connected to the USB controller (via various USB ports) including input devices 918 (e.g., keyboard, mouse, touch screen, trackball, gamepad, camera, microphone, scanners, motion sensing devices), output devices 920 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 922 connected to the I/O controllers 916 may include any type of device, machine, or component that is configured to communicate with a data processing system.

Additional components connected to various busses may include one or more storage controllers 924 (e.g., SATA). A storage controller may be connected to a storage device 926 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 904 such as a PCI Express bus.

A data processing system in accordance with an embodiment of the present disclosure may include an operating system 928, software/firmware 930, and data stores 932 (that may be stored on a storage device 926). Such an operation system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems.

The communication controllers 912 may be connected to the network 914 (not a part of data processing system 900), which can be any public or private data processing system network or combination of networks, as known to those of skill in the art, including the Internet. Data processing system 900 can communicate over the network 914 with one or more other data processing systems such as a server 934 (also not part of the data processing system 900). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 902 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 900 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 900 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method performed by a data processing system comprising:
   receiving a computer aided drafting (CAD) model representing a composite part having a height representing a plurality of composite material layers, where said CAD model contains one or more inclusions within a structural volume;
   generating, for each layer height of the composite part, a ply shape representation at each layer of a composite material within the structural volume having a first surface;
   determining, for each layer height of the composite part, whether the first surface rests on or abuts a second surface;
      if, as a result of the determining step, the first surface rests on the second surface, storing the generated ply shape representation into a container of bottom shapes;
      if, as a result of the determining step, the first surface abuts the second surface, combining the generated ply shape representation with one or more generated ply shapes representing bottom shapes from a previous layer height; and
   generating, as a result of the plurality of determining steps, a resultant model and resultant projection onto a laminate surface of the CAD model having a resulting plurality of represented composite layers, wherein said represented composite layers are not within one or more inclusions of the represented composite part, wherein the composite part can thereafter be manufactured by a three-dimensional printing device or additive manufacturing device.

2. The method of claim 1, wherein the determining step further comprises:
   computing a ply intersection shape and a projection onto the laminate surface;
   shooting a ray from a fill-from-surface;
   determining a fill-to-intersection crossing; and
   determining, based on the determined fill-to-intersection, whether the ray is exiting the structural volume.

3. The method of claim 1, wherein at least one ply has a different material thickness for filling the structural volume from at least one other ply.

4. The method of claim 1, wherein the determining step further comprises:
   computing a ply intersection shape and a projection onto a laminate surface resulting in a CAD curve;
   computing, using the CAD curve, the normal orientation for the intersection shape computed for the curve for the structural volume resulting in a dot product of a ply intersection; and
   determining whether the CAD curve forms the bottom or top of the ply using the dot product.

5. The method of claim 1, further comprising:
   manufacturing the composite part based on the generated resultant model.

6. The method of claim 1, wherein the represented composite part is selected from the group consisting of a door, a strut, a wing, a cowling, a structural panel, and a blade.

7. A data processing system comprising:
   a processor; and
   an accessible memory, the data processing system particularly configured to:
      receive a computer aided drafting (CAD) model representing a composite part having a height representing a plurality of composite material layers, where said CAD model contains one or more inclusions within a structural volume;
      generate, for each layer height of the composite part, a ply shape representation at each layer of a composite material within the structural volume having a first surface;
      determine, for each layer height of the composite part, whether the first surface rests on or abuts a second surface;
         if, as a result of the determining step, the first surface rests on the second surface, storing the generated ply shape representation into a container of bottom shapes;
      if, as a result of the determining step, the first surface abuts the second surface, combining the generated ply shape representation with one or more generated ply shapes representing bottom shapes from a previous layer height; and
      generating, as a result of the plurality of determining steps, a resultant model and resultant projection onto a laminate surface of the CAD model having a resulting plurality of represented composite layers, wherein said represented composite layers are not within one or more inclusions of the represented composite part, wherein the composite part can thereafter be manufactured by a three-dimensional printing device or additive manufacturing device.

8. The data processing system of claim 7, wherein the determining further comprises:
   compute a ply intersection shape and a projection onto the laminate surface;
   shoot a ray from a fill-from-surface;
   determine a fill-to-intersection crossing; and
      determine, based on the determined fill-to-intersection, whether the ray is exiting the structural volume.

9. The data processing system of claim 7, wherein at least one ply has a different material thickness for filling the structural volume from at least one other ply.

10. The data processing system of claim 7, wherein the determining further comprises:
   compute a ply intersection shape and a projection onto a laminate surface resulting in a CAD curve;
   compute, using the CAD curve, the normal orientation for the intersection shape computed for the curve for the structural volume resulting in a dot product of a ply intersection; and
   determine whether the CAD curve forms the bottom or top of the ply using the dot product.

11. The data processing system of claim 7, wherein the data processing system is further configured to:
control the manufacture of the composite part based on the generated resultant model.

12. A non-transitory computer-readable medium encoded with executable instructions that, when executed, cause one or more data processing systems to:
receive a computer aided drafting (CAD) model representing a composite part having a height representing a plurality of composite material layers, where said CAD model contains one or more inclusions within a structural volume;
generate, for each layer height of the composite part, a ply shape representation at each layer of a composite material within the structural volume having a first surface;
determine, for each layer height of the composite part, whether the first surface rests on or abuts a second surface;
if, as a result of the determining step, the first surface rests on the second surface, storing the generated ply shape representation into a container of bottom shapes;
if, as a result of the determining step, the first surface abuts the second surface, combining the generated ply shape representation with one or more generated ply shapes representing bottom shapes from a previous layer height; and
generate, as a result of the plurality of determining steps, a resultant model and resultant projection onto a laminate surface of the CAD model having a resulting plurality of represented composite layers, wherein said represented composite layers are not within one or more inclusions of the represented composite part, wherein the composite part can thereafter be manufactured by a three-dimensional printing device or additive manufacturing device.

13. The non-transitory computer-readable medium of claim 12, wherein the determining further comprises:
compute a ply intersection shape and a projection onto the laminate surface;
shoot a ray from a fill-from-surface;
determine a fill-to-intersection crossing; and
determine, based on the determined fill-to-intersection, whether the ray is exiting the structural volume.

14. The non-transitory computer-readable medium of claim 12, wherein at least one ply has a different material thickness for filling the structural volume from at least one other ply.

15. The non-transitory computer-readable medium of claim 12, wherein the determining further comprises:
compute a ply intersection shape and a projection onto a laminate surface resulting in a CAD curve;
compute, using the CAD curve, the normal orientation for the intersection shape computed for the curve for the structural volume resulting in a dot product of a ply intersection; and
determine whether the CAD curve forms the bottom or top of the ply using the dot product.

16. The non-transitory computer-readable medium of claim 12, wherein the instructions, when executed, further cause the one or more data processing systems to:
control the manufacture of the composite part based on the generated resultant model.

17. The non-transitory computer-readable medium of claim 12, wherein the represented composite part is selected from the group consisting of a door panel, a strut, a wing, a cowling, a structural panel, and a blade.

* * * * *